United States Patent Office 3,521,277
Patented July 21, 1970

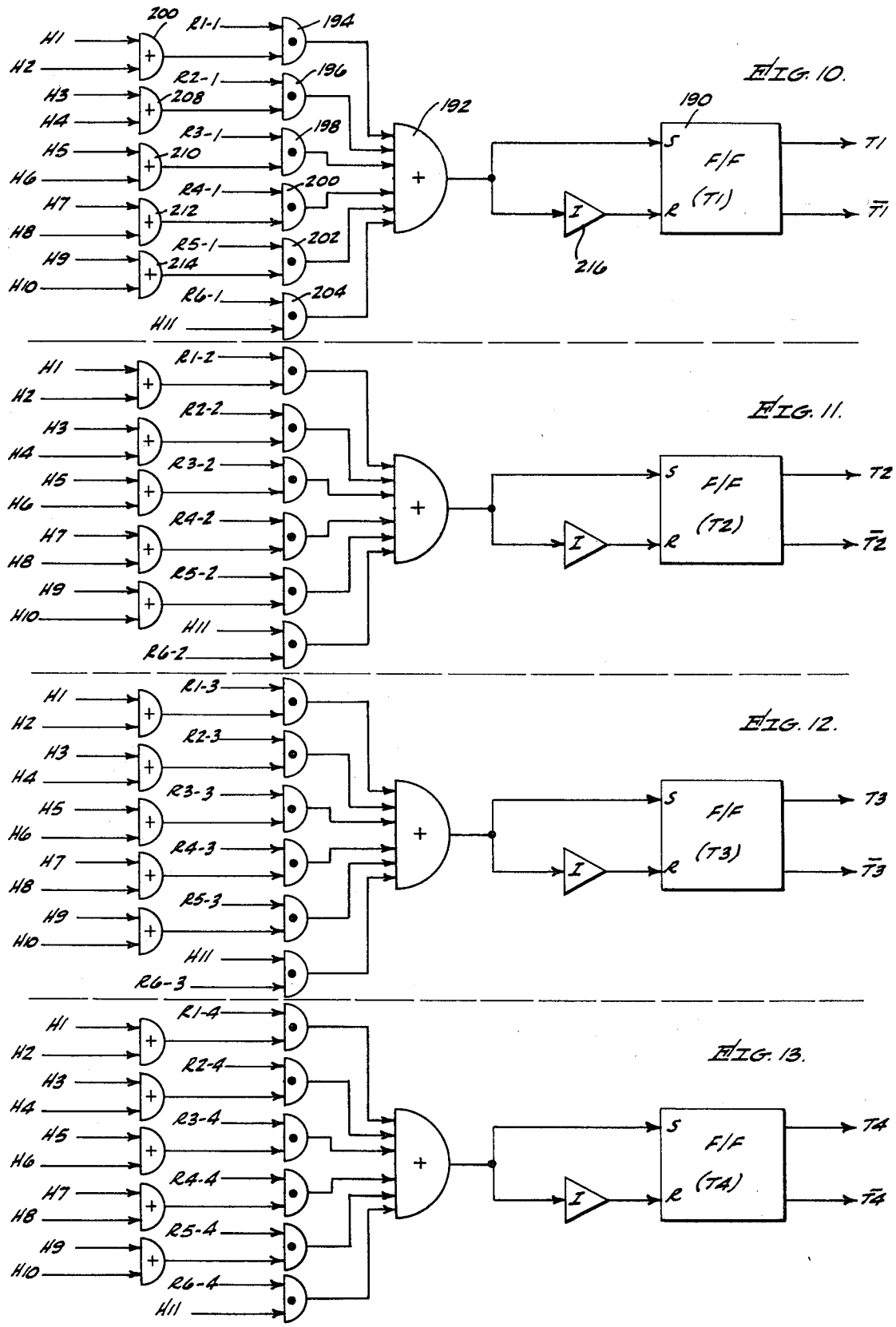

3,521,277
DATA PROCESSOR
Norol T. Evans, San Pedro, Calif., assignor to Hughes Aircraft Company, Culver City, Calif., a corporation of Delaware
Filed Nov. 9, 1966, Ser. No. 593,011
Int. Cl. G01s 9/02
U.S. Cl. 343—5
9 Claims

ABSTRACT OF THE DISCLOSURE

A system for determining the relative position of a valid target within a selected one of a plurality of stacked radar beam lobes wherein, in one embodiment, data input circuitry receives, quantizes and stores the radar video returns from each lobe in memory circuitry in an address location corresponding to the range bin of the radar video returns. Recirculating circuitry undates the data stored in each address location of the memory circuitry. A circuit is coupled to the memory circuitry for determining the relative position of the valid target detected on a particular radar beam lobe by comparing the contents of the address locations which are adjacent to that address location corresponding to the radar lobe containing the valid target.

---

This invention relates to data processing apparatus for processing data input signals in the form of digital pulses and more particularly to a data processing system which is capable of distinguishing data in a first condition from data in a second condition.

The present invention is related in some respects to copending application Ser. No. 585,644 by the same inventor and assigned to the assignee of this invention.

The present invention is especially useful, as an example, with radar surveillance systems or the like. Radar systems of this nature receive video return signals in response to exploratory pulses. Upon receipt thereof the video signals are first quantized or digitized with comparison methods to a clock signal initiated after each exploratory pulse, i.e., the undeveloped video signals are converted to a series of ones and zeros by a video quantizer depending on whether the video return exceeds or does not exceed a threshold level respectively. A video return which exceeds the threshold level of the video quantizer is referred to as a "hit." A video signal that does not exceed the threshold level is referred to as a "miss." A need has developed for an automatic detection system for the automatic processing of the video return from a surveillance radar for determining a ratio of hits and misses which may constitute a valid target or an invalid target.

In automatic processing systems now in existence, valid targets are usually generated by exceeding the aforesaid threshold count of quantized (digitized) video hits. This is usually determined by a sequential observer type counter or "sliding window" type threshold count detector. These devices indicate the valid radar target return when the number of digital video hits exceed the threshold count value within a particular range increment (range bin). However, weather returns, radar interference and jamming, etc., which amount to noise on the receiver may produce sufficient hits in a range bin to indicate a valid target return. In some systems all target reports are stored in a computer memory and processed by the computer to distinguish between valid and invalid target reports.

Video signal returns from a single scan beam received by a radar receiver may have a plurality of signals which exceed the threshold level because of the aforesaid reasons. In these cases not all, if any, of these returns can be classified as a target. In figuring on a probability scale, it has been determined that a hit would allow a counter to count up N bits, say for example two increments, and count down N/2 bits or one increment for a miss. The probability of a false alarm rate is calculated on an individual hit basis. It has been found by calculations that should the counter, counting hits and misses in an individual range bin, reach a count of thirteen, there is a probability of $1.7 \times 10^{-6}$ that the count is a false alarm. Therefore, it is considered that when a count of thirteen has been attained the probabilities of it being a valid target are very high.

Prior art systems employ techniques of assuming that N out of M hits indicate a valid target require, for example, majority logic which is enabled on N out of M the data processing machines used therewith will indicate that a target has been registered. Typical majority logic is enabled if 8 video returns out of 11 indicate a hit, a target is indicated. Too, once the majority logic has been enabled, it will continue to register a target until appropriate minority logic is enabled, for example, the video returns fall below 5 hits out of the aforesaid 11.

These prior art processing systems require that when a stacked beam radar system is used, all of the video inputs are summed in the video quantizer as they are received from the radar receiver. All of the noise of each receiver is also summed and a collapsing loss occurs and consequently the range of the machine itself is greatly reduced.

In one particular concept of this invention a plurality of stacked beams from a radar surveillance system is processed detecting a target due to specified signals on one beam, on two adjacent beams, or three adjacent beams. This takes into consideration the hits-per-return ratio of either a single beam or a single beam plus one or both adjacent beams.

At each range bin interval which corresponds to the radar pulse width, a four-bit word will be read out of and written back into an associated memory. This four-bit word may be contained in a reversible binary counter which counts up two increments for a hit or a binary one applied thereto and counts down one increment for a miss and is designated as a binary zero. The total count possible in the four-bit word is 16. In one embodiment of this invention a counter is provided for each radar beam and each counter processes a single range bin in a sequential order. After a range bin has been processed, its condition found on a single sample is combined with the data of its particular condition previously stored in its address and then returned to memory at its particular location.

Upon ascertaining which radar beam of the plurality of beams contains the target the present invention then determines where the target is positioned within the selected radar lobe. This is referred to as "beam splitting" and is accomplished by dividing the profile width of the selected radar beam into a plurality of imaginary segments. The elevation angle of the target can then be determined by the antenna pattern measurements by first determining the target position relative to one of the imaginary segments. Once the segment of the lobe is ascertained, the accuracy of the elevation of the target is increased. This is especially true when considering that the profile width of a radar lobe is normally 2° and the dimension of the lobe is, as an example, in 16 parts; 8 above the boresight axis N and 8 below, thus increasing the accuracy in elevation to within ⅛ of 1°, as an example. This elevation accuracy is determined by looking to the value of the count registered in associated beams and splitting the beam according to the weight of the registered count.

This technique is advantageous in that it operates on a real time basis and therefore a height of target measurement is performed on every detected target which could conceivably amount to 1200 height reports per minute when, for example, 200 targets are being tracked with a 10 second data rate radar. A further advantage of the present invention is that a more accurate height reading is achieved by this automatic processor.

One object of this invention is to provide a novel and improved data processor which automatically processes digital input data on a real time basis.

Another object of this invention is to provide a novel and improved data processor useful for determining actual target position within a radar beam lobe in response to radar video pulses.

Another object of this invention is to provide a novel and improved data processor which implements and computes a specified event by application of a pulse to pulse correlation process.

Another object of this invention is to provide a novel and improved data processor for determining target elevations without relying on the amplitude of the video return pulses.

Another object of this invention is to provide a novel and improved data processor which is useful for determining the elevation angle of a target within the radar lobe which detected the target.

Another object of this invention is to provide a novel and improved data processor useful with a stacked beam radar surveillance system for detecting the elevation angles of a plurality of targets within specific range bins simultaneously.

These and other objects, features and advantages will become apparent to those skilled in the art when referring to the following detailed description of one preferred embodiment and referenced to the folowing figures illustrating preferred embodiments of this invention wherein:

FIGS. 10 through 13 are logic diagrams of the logic gates for the T subtraction logic.

Figure 1:
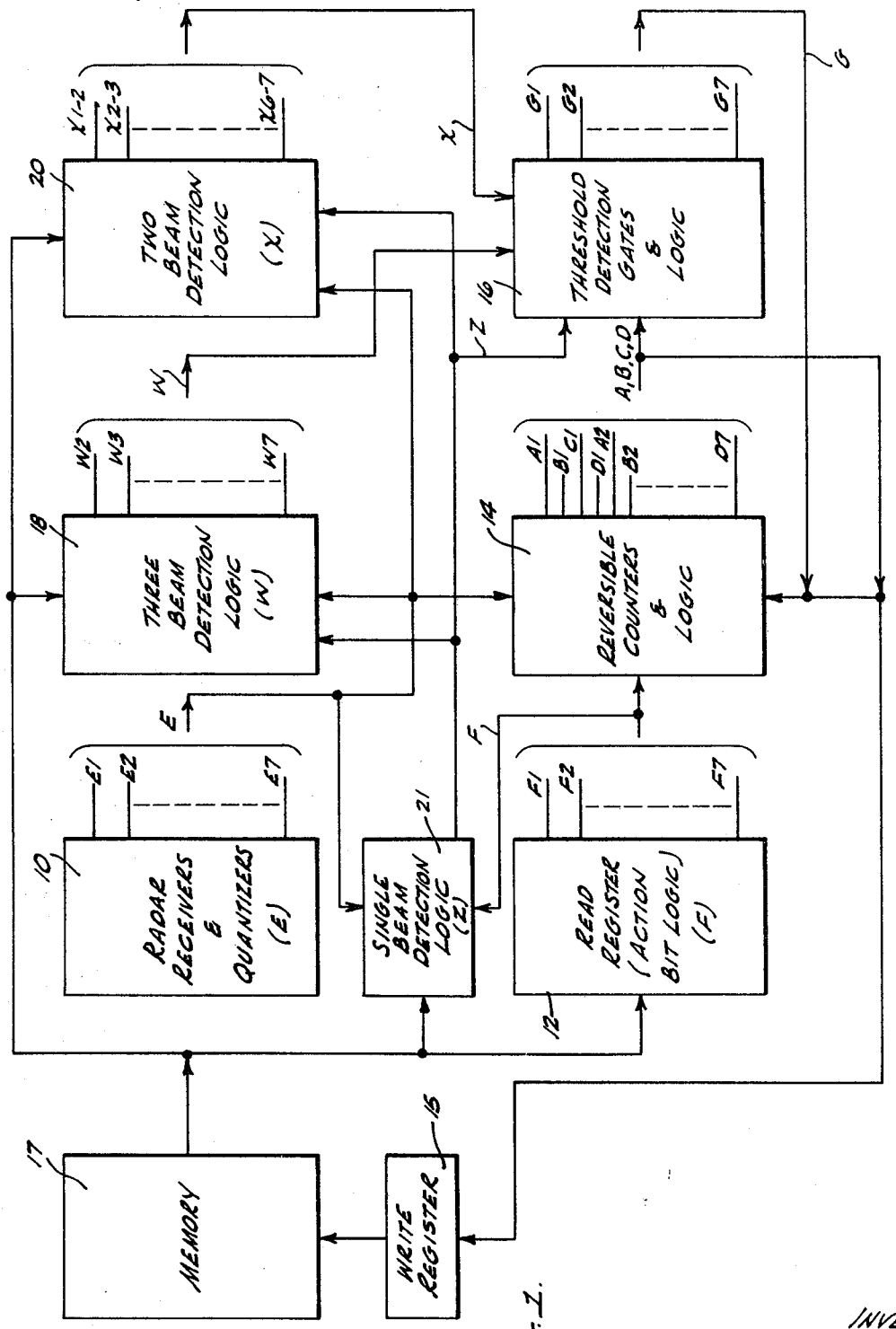
FIG. 1 is a simplified block diagram illustrating a preferred embodiment of this invention when used for processing radar video returns.

In determining the hits-per-return ratio of a single range bin the scan-to-scan correlation or the Markov process of probabilities is applied. This process is best explained in the publication entitled "Introduction to Radar Systems" by Merril I. Skolnick, published by McGraw-Hill 1962, page 55.

The actual count procedure followed in this embodiment follows this process and allows a hit to cause a binary counter to be advanced two counts while a miss causes the counter to count down one count, and when a specific count has been reached, a target is declared. A false alarm rate can thus be generated using this procedure.

The noise false alarm rate on an individual hit basis was selected. The probability of an incoming video signal being a hit being 0.1 or 10% and the probabililty of it being a miss being 0.9 or 90%. With this criteria and assuming the counter was in a state X at the outset of the count, then there is a probability of 0.1 to advance to $(X+2)$ and a probability of 0.9 to decrease to $(X-1)$ the next count signal. The following table may be used as an explanation of the above situation:

TABLE I

| Initial State of Counter: | Next State of the Counter | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | .9 | 0 | .1 | 0 | 0 | 0 | 0 | 0 | 0 | 0 | 0 | 0 | 0 | 0 |
| 1 | .9 | 0 | 0 | .1 | 0 | 0 | 0 | 0 | 0 | 0 | 0 | 0 | 0 | 0 |
| 2 | 0 | .9 | 0 | 0 | .1 | 0 | 0 | 0 | 0 | 0 | 0 | 0 | 0 | 0 |
| 3 | 0 | 0 | .9 | 0 | 0 | .1 | 0 | 0 | 0 | 0 | 0 | 0 | 0 | 0 |
| 4 | 0 | 0 | 0 | .9 | 0 | 0 | .1 | 0 | 0 | 0 | 0 | 0 | 0 | 0 |
| 5 | 0 | 0 | 0 | 0 | .9 | 0 | 0 | .1 | 0 | 0 | 0 | 0 | 0 | 0 |
| 6 | 0 | 0 | 0 | 0 | 0 | .9 | 0 | 0 | .1 | 0 | 0 | 0 | 0 | 0=A |
| 7 | 0 | 0 | 0 | 0 | 0 | 0 | .9 | 0 | 0 | .1 | 0 | 0 | 0 | 0 |
| 8 | 0 | 0 | 0 | 0 | 0 | 0 | 0 | .9 | 0 | 0 | .1 | 0 | 0 | 0 |
| 9 | 0 | 0 | 0 | 0 | 0 | 0 | 0 | 0 | .9 | 0 | 0 | .1 | 0 | 0 |
| 10 | 0 | 0 | 0 | 0 | 0 | 0 | 0 | 0 | 0 | .9 | 0 | 0 | .1 | 1 |
| 11 | 0 | 0 | 0 | 0 | 0 | 0 | 0 | 0 | 0 | 0 | .9 | 0 | 0 | .1 |
| 12 | 0 | 0 | 0 | 0 | 0 | 0 | 0 | 0 | 0 | 0 | 0 | .9 | 0 | .0 |
| 13 | 1. | 0 | 0 | 0 | 0 | 0 | 0 | 0 | 0 | 0 | 0 | 0 | 0 | 0 |

Each row of the table indicates an initial state of the counter. The count of the counter can only advance to its next state with the probability indicated. For example, with the initial count of three maintained in the counter, it can advance to a five with the probability of 0.1 or it can decrease to two with the probability of 0.9 and it has a probability of 0 going to any other state. Since each of the rows in the table sum to 1, it can be treated as a probability matrix A.

The above indicates that regardless of the state which the counter started, the probability of it being at a count of three for instance is given by an entry in Column 3 of Table I, but because entries within this column are equal or each row is identical, the probabilities of the count being a false alarm is computed as follows in Table II:

TABLE II

| Count: | Probability |
|---|---|
| 0 | $7.78 \times 10^{-1}$ |
| 1 | $8.64 \times 10^{-2}$ |
| 2 | $9.60 \times 10^{-2}$ |
| 3 | $2.027 \times 10^{-2}$ |
| 4 | $1.29 \times 10^{-2}$ |
| 5 | $3.69 \times 10^{-3}$ |
| 6 | $1.84 \times 10^{-3}$ |
| 7 | $6.12 \times 10^{-4}$ |
| 8 | $2.71 \times 10^{-4}$ |
| 9 | $9.63 \times 10^{-5}$ |
| 10 | $3.89 \times 10^{-5}$ |
| 11 | $1.31 \times 10^{-5}$ |
| 12 | $3.89 \times 10^{-6}$ |
| 13 | $1.7 \times 10^{-6}$ |

When detection occurs on a particular beam and a particular range bin, large counts on adjacent beam positions have a very low probability of being caused by noise alone. For instance, in only 0.184% of the time will the adjacent beams have a count of six due to noise, but the count of 6 has a 99.816% of being due to a target. Because of this fact and, as will be explained in connection with this invention, the counts on the adjacent beams are used to perform the elevation beam-splitting operation to determine the position of the target in elevation.

Figure 2:
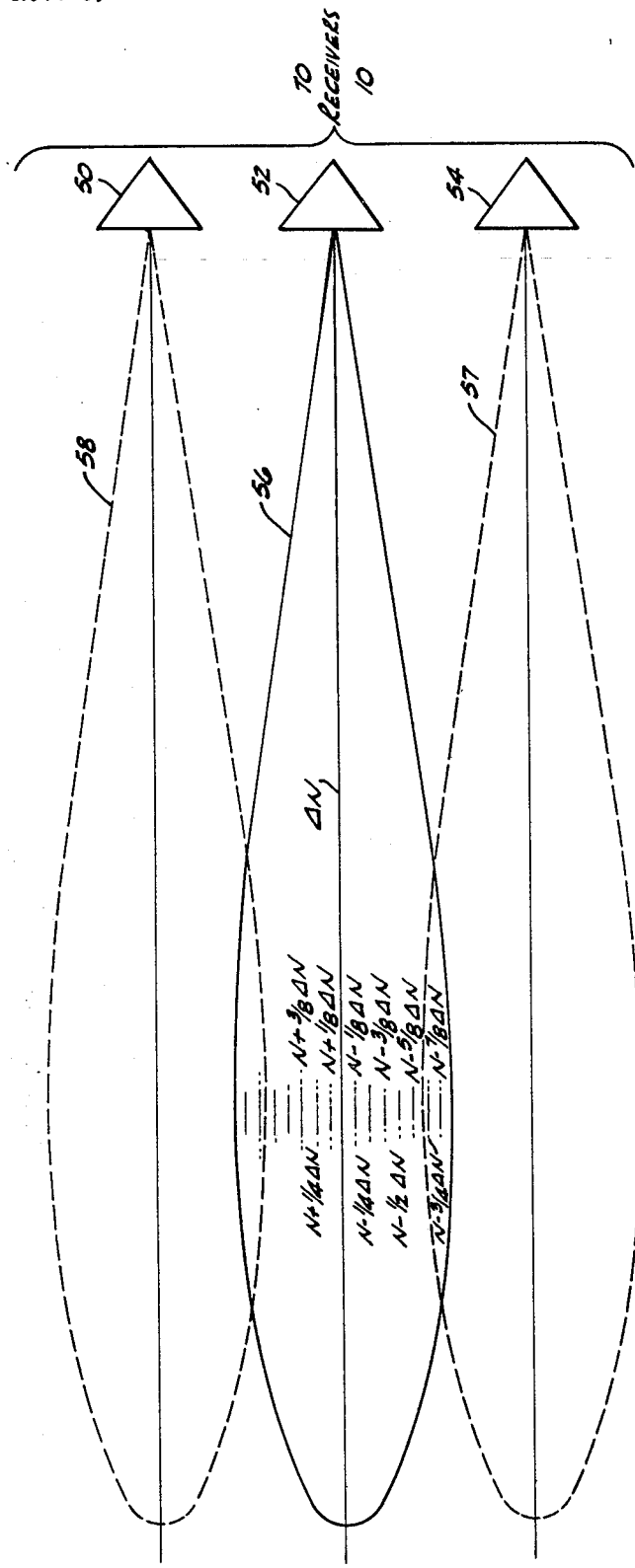
FIG. 2 is a graphic diagram illustrating arbitrarily selected adjacent radar lobes.

Basic rules have been calculated by the aforesaid probability tables wherein a selected beam as shown in FIG. 2 has indicated that a valid target has been determined thereon. For single beam detection rules for determining the exact position of the target within the lobe of the radar beam and using the term N as selected lobe 56 and the term $N-1$ as an adjacent lobe 57 below the lobe 56 band the term $N+1$ as the adjacent lobes 58 above the selected lobe and by dividing each lobe into fractional increments ΔN, the following rules will accurately position the target within its lobe for increased resolution of the target elevation. The rules are as follows:

Count on beam $N-1<6$ and $N+1<6$ use position N
Count on beam $N-1>6$ and $N+1<6$ compute $$N-(N-1)=X$$

and if:

$X=1$ or 2 use $N-\frac{3}{8}\Delta N$
$X=3$ or 4 use $N-\frac{1}{4}\Delta N$
$X\geqq 5$ use $N-\frac{1}{8}\Delta N$ Count on beam $N-1<6$, and $N+1>6$ compute $$N-(N+1)=X$$

and if:

TABLE III $X=1$ or 2 use $N+\frac{3}{8}\Delta N$
$X=3$ or 4 use $N+\frac{1}{4}\Delta N$
$X\geqq 5$ use $N+\frac{1}{8}\Delta N$ For two-beam detection on N and $N+1$ the difference is computed as follows:

$$[N-(N+1)]=X$$

Wherein the beam splitting detection rules are:

TABLE IV $X=0$ use $N+\frac{1}{2}\Delta N$
$X=+1$ or $+2$ use $N+\frac{3}{8}\Delta N$
$X=+3$ or $+4$ use $N+\frac{1}{4}\Delta N$
$X=+5$ or $+6$ use $N+\frac{1}{8}\Delta N$
$X=-1$ or $-2$ use $N+\frac{5}{8}\Delta N$
$X=-3$ or $-4$ use $N+\frac{3}{4}\Delta N$
$X=-5$ or $-6$ use $N+\frac{7}{8}\Delta N$ For detection on three beams $N-1$ and $N+1$ compute the difference $$(N-1)-(N+1)=X$$

Wherein the following three beam detection rules are:

TABLE V $X=0$ use $N$
$X=+1$ or $+2$ use $N-\frac{1}{8}\Delta N$
$X=+3$ or $+4$ use $N-\frac{1}{4}\Delta N$
$X=-1$ or $-2$ use $N+\frac{1}{8}\Delta N$
$X=-3$ or $-4$ use $N+\frac{1}{4}\Delta N$ Turning now to a more detailed description of the preferred embodiment of this invention, there is shown in FIG. 1 a plurality of radar receivers 10 which receive input data from a plurality of input channels which may be video signals from a radar system or the like (not shown). Each video signal is quantized within receivers and quantizers 10 and presents digital data on a plurality of output channels designated E1 through E7 corresponding to each individual receiver. Seven radar video return beams have been shown here only as an example and it should be understood that more beams may be processed by this invention using increased equipment for each beam.

Each receiver 10 receives a video signal from stacked radar beams on a real time basis and in this particular embodiment seven receivers are used for seven particular beams. The E1–E7 outputs of these receivers and quantizers 10 are presented to the reversible counters and logic 14.

The read register 12 comprises a plurality of outputs F1 through F7 which logically indicate that if certain of these outputs are true a target is stored in a memory 17 at address locations which correspond to specific range bins of a specific radar beam as determined by incoming G terms from a threshold gate 16. Read register 12 is coupled to data channels of a data storage device such as a core memory device 17 which store data in address locations corresponding to the range bin locations. The data is continually recirculated from the memory 17 through the read register 12 through logic circuits which are updated by the incoming E1–E7 terms and stored back into the memory 17 through write register 15 until a target has been ascertained. Read register 12 provides a plurality of outputs denoted as F1–F7 and each of these outputs is presented to reversible counters and logic or counter logic 14 through output channels generally designated F. Although not shown in FIG. 1, but which will be described later, each of the outputs F1–F7 is also presented to the three beam detection logic 18, the two beam detection logic 20, and the single beam detection logic 21. An F term indicates a target has been determined and an $\bar{F}$ indicates a target has not been determined. The counter logic 14 comprises a plurality of counters one through seven which corresponds to the terms F1–F7 and also responds to the video signals E emanating from receivers and quantizers 10. The output signals from each counter are generally designated A, B, C and D. Where A is the most significant digit of the read register 12, B is the third least significant digit of the read register 12, C is the second least significant digit of read register 12 and D is the least significant digit of read register 12. When taking all digit terms into consideration, they constitute some binary number indicative of the value of the hits per miss ratio of a target at the range bins during any specific sample time. Each of these counters operate by their logic to cause their associated counters to update the value of the data in a corresponding memory channel by causing the contents thereof to count up two increments for each binary one and count down one increment for each binary zero of the video signals E. The output of the counter logic 14 is coupled to threshold detection logic 16 by the lead line generally designated A, B, C, D. Threshold detection logic 16 comprises a plurality of gates, the outputs of which are denoted as G1–G7 and each gate is enabled when a target is indicated by the count contained in the associated counters 14 as updated by incoming E terms. The output of the G1 through G7 gates is presented directly as enabling terms to the write register 15.

Also coupled as inputs to threshold detection logic 16 are the outputs W2 through W6 from a three-beam detection logic 18 by the lead line generally designated W. The three-beam detection logic 18 is enabled by the output terms A, B, C, D from memory 17 which indicates the state of the data at corresponding range bins, the F terms from read register 12, and also by the video signals E. Also coupled as enabling inputs to threshold detection gates and logic 16 are the outputs X1–2, X2–3, X3–4, X4–5, X5–6, and X6–7 from two-beam detection logic (X) 20 which is also enabled by the data stored in memory 17 during specific range bins, the F terms from read register 12, and by the video input signals E. And finally, single beam detection logic 21, which is enabled by the data stored in memory 17 during specific range bins, the F terms from read register 12, and the video input signals E, provides enabling signals Z1 through Z7 to the threshold detection logic 16 for determining whether a target has been declared on a single beam.

In operation the video signals are presented to counters and logic 14. Each counter as previously indicated will cause the contents of the data being recirculated during a specific corresponding range bin address to increase in value two increments if a hit or a one is determined, but will cause the contents thereof to decrease in value one increment if a miss or a zero has been determined. When the data in the memory 17 during a specific input addressed range bin reaches a count of 13, in the counters and logic 14 by updating signals from receivers 10, it has been determined by the aforementioned probability table that a target has been indicated and the appropriate gate G will be enabled by the threshold detection gates and logic 16. This gate G then will cause the appropriate F flip-flop of read register 12 to be enabled and store a target in the memory while resetting the counter to zero.

Further, if two adjacent counters each reach a count of six or more the probability of a hit is also indicated and the appropriate logic gate G will be enabled and this is carried out by two-beam detection logic (X) 20. If three counters indicate that a center counter has a count of eight contained therein and adjacent counters on either side thereof have a count of three or more the probability of a hit is determined and the appropriate threshold gate will register a hit to write register 15.

When the contents of a single storage address in memory 17 reaches a specific count, an F is stored indicating a target during that specific range bin and the associated counter is reset to zero. The leading edge of the target is now declared. The next step is to detect when the target has diminished or the trailing edge has been declared. This is accomplished in the same manner with the exception that the counter logic 14 contents (now reset to zero by a G1) increase two increments on a miss or a zero and decrease one increment on a hit or one from the radar receiver and quantizer 10.

Figure 3:
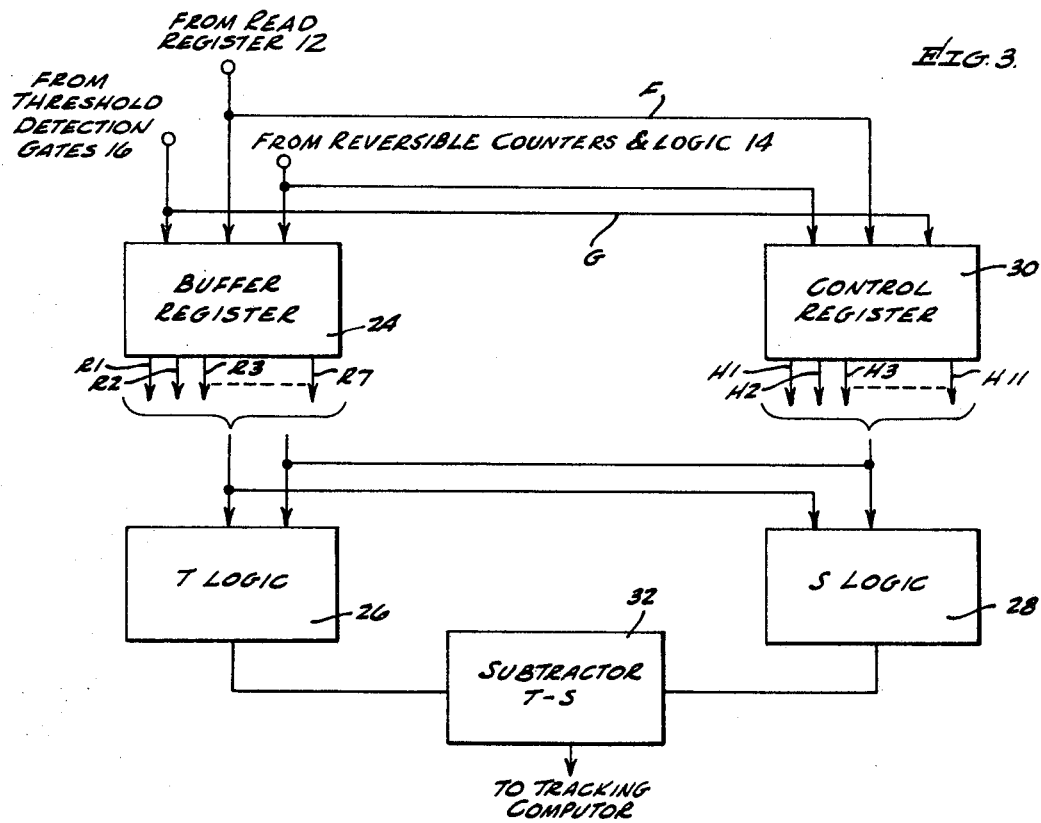
FIG. 3 is a logic block diagram of one preferred embodiment of this invention for detecting height of a target within a beam.

Referring now to FIGS. 2 and 3 collectively there is shown specifically in FIG. 2 three typical radar lobes emanating from radar antennas 50, 52 and 54 which provide outputs as video return signals to the receivers 10.

Lobe 56 as an example may be indicated as the radar lobe N where its boresight $\Delta N$ is divided into imaginary increments 8 above and 8 below the boresight $\Delta N$. Those increments below the boresight $\Delta N$ are designated as follows:

$$N-\tfrac{1}{8}\Delta N$$
$$N-\tfrac{1}{4}\Delta N$$
$$N-\tfrac{3}{8}\Delta N$$
$$N-\tfrac{1}{2}\Delta N$$
$$N-\tfrac{5}{8}\Delta N$$
$$N-\tfrac{3}{4}\Delta N$$
$$N-\tfrac{7}{8}\Delta N$$

Those increments above the bore-sight $\Delta N$ are designated $$N+\tfrac{1}{8}\Delta N$$
$$N+\tfrac{1}{4}\Delta N$$
$$N+\tfrac{3}{8}\Delta N$$
$$N+\tfrac{1}{2}\Delta N$$
$$N+\tfrac{5}{8}\Delta N$$
$$N+\tfrac{3}{4}\Delta N$$
$$N+\tfrac{7}{8}\Delta N$$

By this invention, as shown in FIG. 2, the position of a target located within the selected lobe 56 is positioned relative to one of the plurality of increments within the lobe. This is accomplished by the count determined in the reversible counters and logic 14 relative to adjacent counters. Once it has been determined in which increment the target is situated, this data is processed and sent to a tracking computer (not shown). The value of X of Table III is determined and the actual beamsplitting takes place in the tracking computer.

Buffer register 24 as illustrated in FIG. 3 reflects the count from the counters in reversible counters and logic 14 and holds the data therefrom in the buffer register 24 for one-bit time. Each of the seven registers within the buffer 24 comprises four flip-flops which provide outputs R-1 through R-4 and provide outputs as generally designated by an R term (R1, R2, R3, R4, R5, R6 or R7) to subtraction logic (T) 26 and also to subtraction logic (S) 28. For example, the outputs of the first register are R1-1 through R1-4 and are collectively shown in the output of buffer register 24 as R1, while the outputs of the second register are R2-1 through R2-4 and are collectively shown in the output of buffer register 24 as R2, etc. A control register 30 has a plurality of outputs H1 through H11 which steers specific signals from associated radar lobes to the correct subtraction logic (T) and (S) 26 and 28 to correctly perform $T-S$. Like buffer register 24, control register 30 is enabled by inputs from threshold detection gates 16, from reversible counters and logic 14 and from read register 12, and thus keeping with the tables as previously mentioned the $T-S$ will indicate the $(N-1)-(N+1)=X$. This is accomplished in the subtractor 32 and the output therefrom gives the value of X which can then be used in a tracking computer (not shown) for determining the exact position of $\Delta N$ within the radar lobe 56 as shown in FIG. 2.

Buffer register 24 will provide the count of hits determined by the detection logic 16 as stored in the memory 27 and will sequentially present this to the subtraction logic 26 (T) for presenting the value N to the subtractor 32. Subtraction logic 28 provides the subtraction value of $N\pm 1$ from the control register 30 and the buffer register 24.

The following equations are made in Boolean notations for the purpose of illustrating the enabling inputs to the plurality of flip-flops contained in the buffer register 24.

Figure 4:
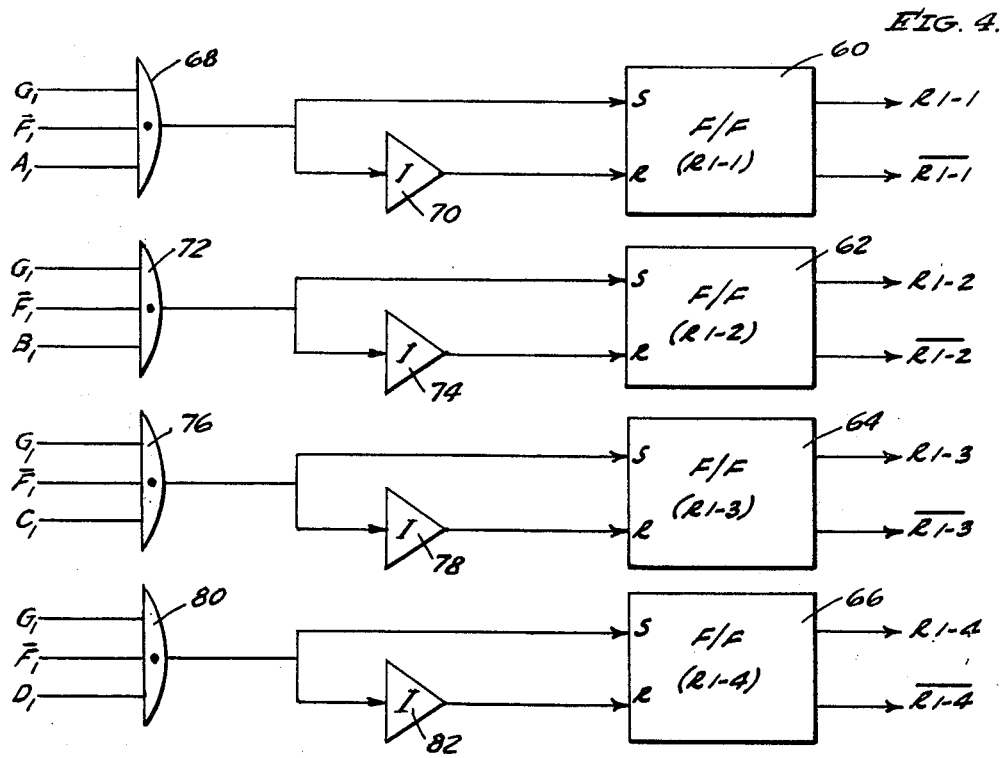
FIG. 4 is a logic diagram illustrating the logic gates of a typical buffer register used with this invention.
Figure 6:
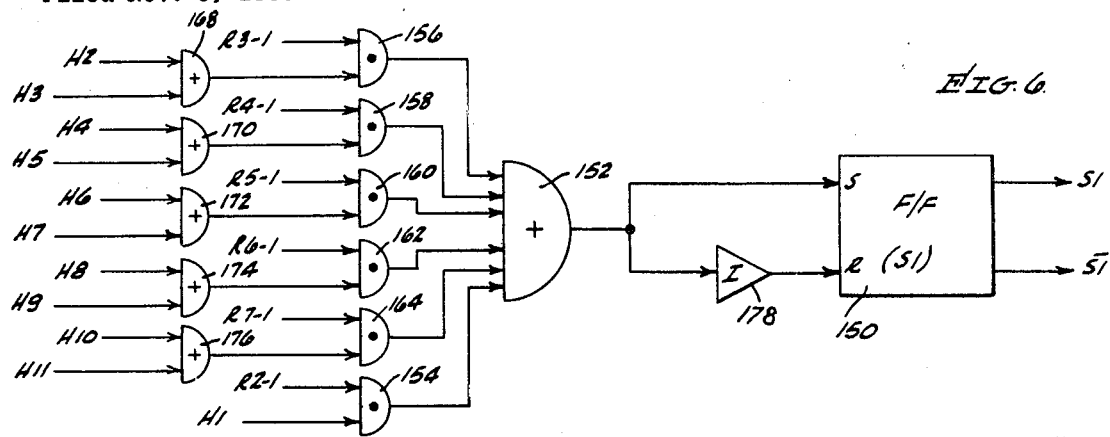
FIGS. 6 through 9 are logic diagrams of the logic gates for the S subtraction logic.
Figure 7:
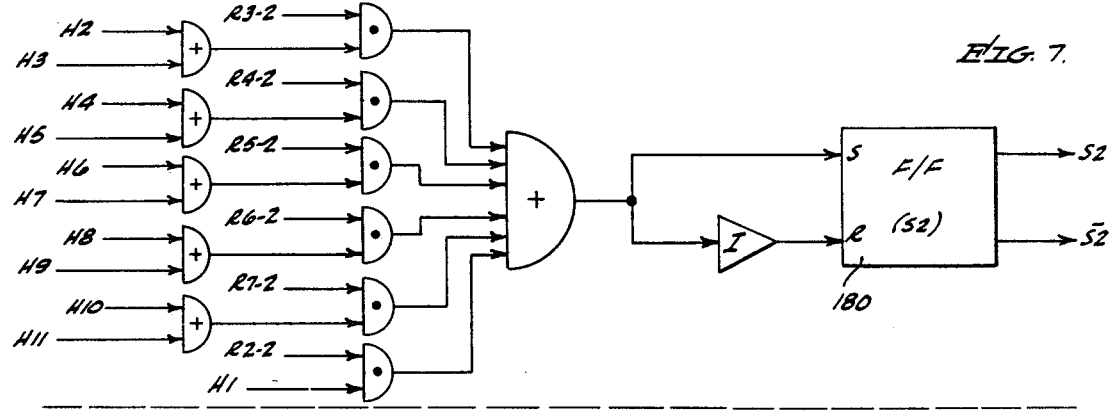
Figure 8:
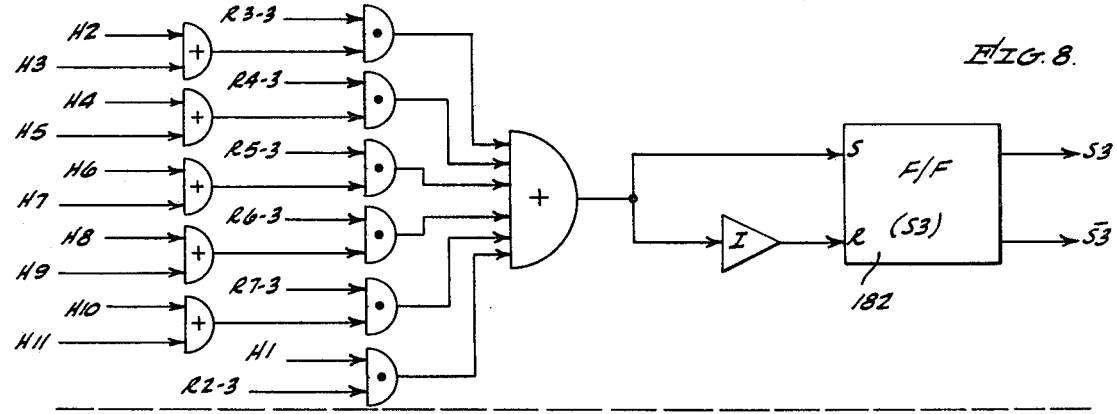
Figure 9:
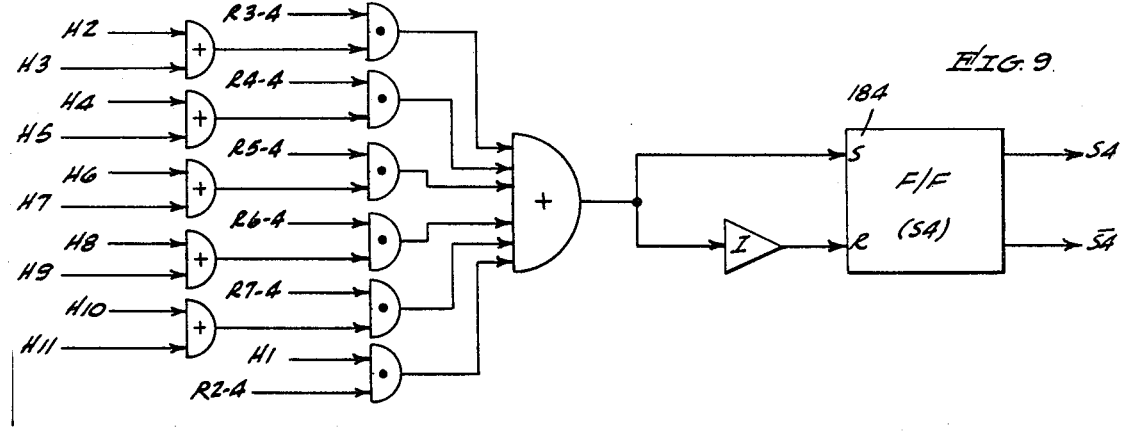

Set $R1\text{-}1=G1\overline{F1}A1$      Reset $R1\text{-}1=\overline{\text{Set }\overline{R1\text{-}1}}$
Set $R1\text{-}2=G1\overline{F1}B1$      Reset $R1\text{-}2=\overline{\text{Set }\overline{R1\text{-}2}}$
Set $R1\text{-}3=G1\overline{F1}C1$      Reset $R1\text{-}3=\overline{\text{Set }\overline{R1\text{-}3}}$
Set $R1\text{-}4=G1\overline{F1}D1$      Reset $R1\text{-}4=\overline{\text{Set }\overline{R1\text{-}4}}$ Set $R2\text{-}1=G2\overline{F2}A2$      Reset $R2\text{-}1=\overline{\text{Set }\overline{R2\text{-}1}}$
Set $R2\text{-}2=G2\overline{F2}B2$      Reset $R2\text{-}2=\overline{\text{Set }\overline{R2\text{-}2}}$
Set $R2\text{-}3=G2\overline{F2}C2$      Reset $R2\text{-}3=\overline{\text{Set }\overline{R2\text{-}3}}$
Set $R2\text{-}4=G2\overline{F2}D2$      Reset $R2\text{-}4=\overline{\text{Set }\overline{R2\text{-}4}}$ Set $R3\text{-}1=G3\overline{F3}A3$      Reset $R3\text{-}1=\overline{\text{Set }\overline{R3\text{-}1}}$
Set $R3\text{-}2=G3\overline{F3}B3$      Reset $R3\text{-}2=\overline{\text{Set }\overline{R3\text{-}2}}$
Set $R3\text{-}3=G3\overline{F3}C3$      Reset $R3\text{-}3=\overline{\text{Set }\overline{R3\text{-}3}}$
Set $R3\text{-}4=G3\overline{F3}D3$      Reset $R3\text{-}4=\overline{\text{Set }\overline{R3\text{-}4}}$ Set $R4\text{-}1=G4\overline{F4}A4$      Reset $R4\text{-}1=\overline{\text{Set }\overline{R4\text{-}1}}$
Set $R4\text{-}2=G4\overline{F4}B4$      Reset $R4\text{-}2=\overline{\text{Set }\overline{R4\text{-}2}}$
Set $R4\text{-}3=G4\overline{F4}C4$      Reset $R4\text{-}3=\overline{\text{Set }\overline{R4\text{-}3}}$
Set $R4\text{-}4=G4\overline{F4}D4$      Reset $R4\text{-}4=\overline{\text{Set }\overline{R4\text{-}4}}$ Set $R5\text{-}1=G5\overline{F5}A5$      Reset $R5\text{-}1=\overline{\text{Set }\overline{R5\text{-}1}}$
Set $R5\text{-}2=G5\overline{F5}B5$      Reset $R5\text{-}2=\overline{\text{Set }\overline{R5\text{-}2}}$
Set $R5\text{-}3=G5\overline{F5}C5$      Reset $R5\text{-}3=\overline{\text{Set }\overline{R5\text{-}3}}$
Set $R5\text{-}4=G5\overline{F5}D5$      Reset $R5\text{-}4=\overline{\text{Set }\overline{R5\text{-}4}}$ Set $R6\text{-}1=G6\overline{F6}A6$      Reset $R6\text{-}1=\overline{\text{Set }\overline{R6\text{-}1}}$
Set $R6\text{-}2=G6\overline{F6}B6$      Reset $R6\text{-}2=\overline{\text{Set }\overline{R6\text{-}2}}$
Set $R6\text{-}3=G6\overline{F6}C6$      Reset $R6\text{-}3=\overline{\text{Set }\overline{R6\text{-}3}}$
Set $R6\text{-}4=G6\overline{F6}D6$      Reset $R6\text{-}4=\overline{\text{Set }\overline{R6\text{-}4}}$ Set $R7\text{-}1=G7\overline{F7}A7$      Reset $R7\text{-}1=\overline{\text{Set }\overline{R7\text{-}1}}$
Set $R7\text{-}2=G7\overline{F7}B7$      Reset $R7\text{-}2=\overline{\text{Set }\overline{R7\text{-}2}}$
Set $R7\text{-}3=G7\overline{F7}C7$      Reset $R7\text{-}3=\overline{\text{Set }\overline{R7\text{-}3}}$
Set $R7\text{-}4=G7\overline{F7}D7$      Reset $R7\text{-}4=\overline{\text{Set }\overline{R7\text{-}4}}$ With reference to FIG. 4, the first register R1 of the buffer register 24 (FIG. 3) is illustrated to show the mechanization of the aforementioned Boolean equations for the first register. It is to be understood that the remaining registers in buffer register 24 are mechanized in a similar fashion and according to their respective Boolean equations as shown above. In the R1 register of FIG. 4, four flip-flops 60, 62, 64 and 66 provide outputs R1-1, $\overline{R1\text{-}1}$, R1-2, $\overline{R1\text{-}2}$, R1-3, $\overline{R1\text{-}3}$, R1-4, $\overline{R1\text{-}4}$, respectively. Flip-flop 60 is set or enabled by the output of an AND gate 68 which is enabled by A1 from the reversible counters and logic 14, by $\overline{F1}$ from the read register 12, and by G1 from the threshold detection gates and logic 16. The output of the AND gate 68 is also coupled through an inverter 70 to the reset side of flip-flop 60. Flip-flop 62 is enabled by the output of an AND gate 72 which is enabled by the signals B1, $\overline{F1}$ and G1. The output of the AND gate 72 is also coupled through an inverter 74 to the reset side of flip-flop 62. Flip-flop 64 is set by the output of an AND gate 76 which is enabled by the signals C1, $\overline{F1}$ and G1. The output of the AND gate 76 is also coupled through an inverter 78 to the reset side of flip-flop 64. And finally, flip-flop 66 is enabled by the output of an AND gate 80 which in turn is enabled by the signals D1, $\overline{F1}$ and G1. The output of the AND gate 80 is also coupled through an inverter 82 to the reset side of flip-flop 65.

The R1 register thus can transfer the contents from a specific address location of a particular range bin from the memory 17 and delay it one-bit time before it is sent to the subtraction logic (T) 26 and the subtraction logic (S) 28 for beam-splitting purposes.

Registers R2, R3, R4, R5, R6 and R7 operate like the R1 register in transferring data from specific radar beams to the outputs thereof and are not shown as discussed. However, for example, it is evident that the R2 register is enabled by an A2, B2, C2 or D2 from the reversible counters and logic 14 in a manner described for transferring the weighted value of the beam lobes to the subtraction logic. It is at this time that the tracking computer computes the position of the target within a single lobe.

Figure 5:
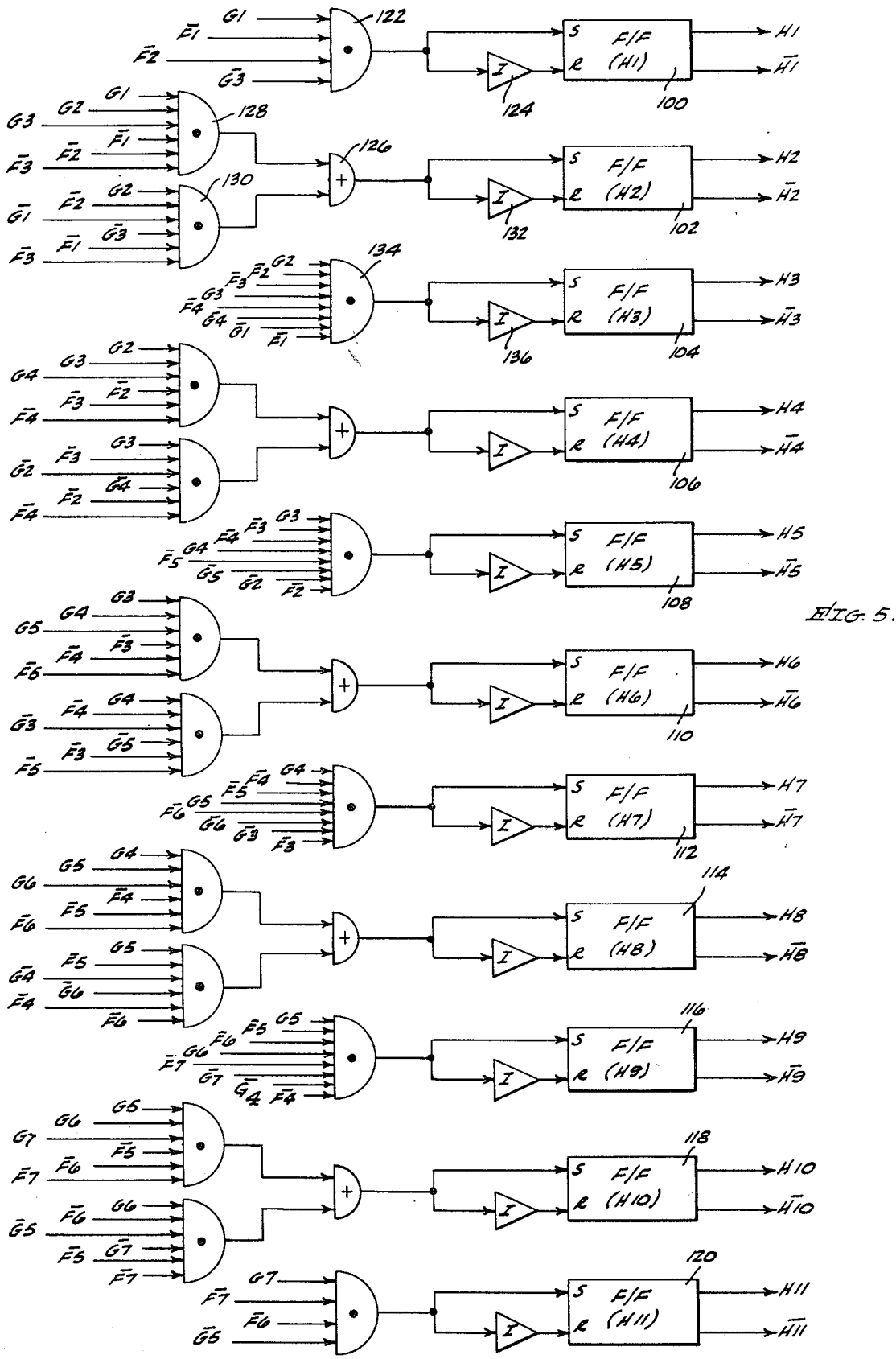
FIG. 5 is a logic diagram illustrating logic gates for the control register of this invention.

The conrol register 30 performs the steering of the specific signals into subtraction logic units 26 and 28 to indicate single beam, double beam or triple beam decisions to determine the position of the target in elevation. The control register comprises a plurality of flip-flops which is enabled by logic as set forth in the following notations:

Set $H1 = G1\ \overline{F1}\ \overline{F2}\ \overline{G3}$
Reset $H1 = \overline{Set\ H1}$
Set $H2 = G1\ G2\ G3\ \overline{F1}\ \overline{F2}\ \overline{F3} + G2\ \overline{F2}\ \overline{G1}\ \overline{G3}\ \overline{F1}\ \overline{F3}$
Reset $H2 = \overline{Set\ H2}$
Set $H3 = G2\ \overline{F2}\ \overline{F3}\ G3\ \overline{F4}\ \overline{G4}\ \overline{G1}\ \overline{F1}$
Reset $H3 = \overline{Set\ H3}$
Set $H4 = G2\ G3\ G4\ \overline{F2}\ \overline{F3}\ \overline{F4} + G3\ \overline{F3}\ \overline{G2}\ \overline{G4}\ \overline{F2}\ \overline{F4}$
Reset $H4 = \overline{Set\ H4}$
Set $H5 = G3\ \overline{F3}\ \overline{F4}\ G4\ \overline{F5}\ \overline{G5}\ \overline{G2}\ \overline{F2}$
Reset $H5 = \overline{Set\ H5}$
Set $H6 = G3\ G4\ G5\ \overline{F3}\ \overline{F4}\ \overline{F5} + G4\ \overline{F4}\ \overline{G3}\ \overline{G5}\ \overline{F3}\ \overline{F5}$
Reset $H6 = \overline{Set\ H6}$
Set $H7 = G4\ \overline{F4}\ \overline{F5}\ G5\ \overline{F6}\ \overline{G6}\ \overline{G3}\ \overline{F3}$
Reset $H7 = \overline{Set\ H7}$
Set $H8 = G4\ G5\ G6\ \overline{F4}\ \overline{F5}\ \overline{F6} + G5\ \overline{F5}\ \overline{G4}\ \overline{G6}\ \overline{F4}\ \overline{F6}$
Reset $H8 = \overline{Set\ H8}$
Set $H9 = G5\ \overline{F5}\ \overline{F6}\ G6\ \overline{F7}\ \overline{G7}\ \overline{G4}\ \overline{F4}$
Reset $H9 = \overline{Set\ H9}$
Set $H10 = G5\ G6\ G7\ \overline{F5}\ \overline{F6}\ \overline{F7} + G6\ \overline{F6}\ \overline{G5}\ \overline{G7}\ \overline{F5}\ \overline{F7}$
Reset $H10 = \overline{Set\ H10}$
Set $H11 = G7\ \overline{F7}\ \overline{F6}\ \overline{G5}$
Reset $H11 = \overline{Set\ H11}$ The above equation can best be implemented by the logic diagram shown as an example in FIG. 5 wherein flip-flops 100, 102, 104, 106, 108, 110, 112, 114, 116, 118 and 120 comprise the control register 30 which has a plurality of outputs H1 and $\overline{H1}$ through H11 and $\overline{H11}$ respectively. These outputs are sent to the aforesaid subtraction logic unts 26 and 28 as shown in FIG. 3.

Flip-flop 100, for example, is triggered by outputs from the read register 12 in the form of $\overline{F1}\ \overline{F2}$ and also by the G1 and $\overline{G3}$ outputs from the threshold detection gates and logic 16. These signals are presented to the AND gate 122 with the output thereof coupled to the set side of flip-flop 100 and also to an inverter 124 which in turn is coupled to the reset side of flip-flop 100. This particular logic applied to AND gate 122 is for single beam detection as laid out in Table III.

Flip-flop 102 is enabled on the single beam detection or on three beam detection as set forth in Table III and Table IV. Flip-flop 102 is enabled by the output of an OR gate 126 which in turn is enabled by the output of AND gate 128 or AND gate 130. AND gate 128 is enabled by three adjacent gating signals and in this particular configuration G1, G2 and G3 being true and the same three adjacent targets $\overline{F1}$, $\overline{F2}$, $\overline{F3}$ not being stored. OR gate 126 may also be enabled by the output of AND gate 130. AND gate 130 is enabled by the term G2 $\overline{F2}$ indicating that a target has been declared on the second beam and not yet been stored by the $\overline{F2}$, by a $\overline{G1}$, a $\overline{G3}$, an $\overline{F1}$ and an $\overline{F3}$, indicating that adjacent beams on the G1 and G3, for example, have not yet declared a target nor has a target been stored. It now becomes necessary to look at the specific count of these adjacent beams as set forth in the buffer register and subtractions can be made in the subtraction logic units 26 and 28 to be explained later. The output of OR gate 126 is also presented to the input of an inverter 132 and the output therefrom is presented to the reset side of flip-flop 102 while the output of OR gate 126 is presented to the set side of flip-flop 102.

Flip-flop 104 is enabled by the output of AND gate 134 which is presented to an inverter 136 which has its output coupled to the reset side of flip-flop 104. This particular H3 term from flip-flop 104 provides for double beam detection and AND gate 134 is enabled by logic terms which indicate that targets have been declared on beams 2 and 3 but has not been stored in the memory address locations 1, 2, 3 or 4. This indicates that the respective counters to the beams 2 and 3 have reached the count to sufficiently justify targets stored but must look to the buffer register for the value stored at address location 4 to correspond with the $\overline{F4}$ and the value stored at address location 1 to correspond with $\overline{F1}$ for determining the specific elevation. Again, this is accomplished by looking to the value of the buffer register 24.

The remaining flip-flops 106 through 118 operate in a repetitive and sequential order as does 102 and 104 for 3 and 2 beam detection respectively. Flip-flop 120 operates on a similar manner as flip-flop 100 but it is enabled by the data stored in locations 5, 6 and 7 and is for single beam detection only.

As an example for operation of the control register 30 the following truth table can be used in connection with FIG. 5 for showing the simplicity of the logic terms to the enabling gates.

| | \multicolumn{7}{c}{BEAM NUMBER} | | | | | | |
|---|---|---|---|---|---|---|---|
| | 1 | 2 | 3 | 4 | 5 | 6 | 7 |
| H1 | X | | | | | | |
| H2 | X | X | X | | | | |
| H2 | | X | | | | | |
| H3 | | X | X | | | | |
| H4 | | X | X | X | | | |
| H4 | | | X | | | | |
| H5 | | | X | X | | | |
| H6 | | | X | X | X | | |
| H6 | | | | X | | | |
| H7 | | | | X | X | | |
| H8 | | | | X | X | X | |
| H8 | | | | | X | | |
| H9 | | | | | X | X | |
| H10 | | | | | X | X | X |
| H10 | | | | | | X | |
| H11 | | | | | | | X |

For example, the H1 flip-flop 100 is true and Exhibit H1 output to indicate single beam detection on beam 1 wherein G1 declares a target and $\overline{F1}$ indicates that a target has not yet been stored in the memory 17 in connection with beam 1.

$\overline{F2}$ declares that a target has not yet been stored for radar beam No. 2 nor has a target been declared on radar beam No. 3 as noted by the $\overline{G3}$.

H2 flip-flop 102 is true on either single beam detection on beam No. 2 or three beam detection on beams No. 1, No. 2 and No. 3. By the logic diagram as shown in FIG. 5, AND gate 128 provides single beam detection on beams No. 1, No. 2 and No. 3 and will position the target at the boresight of beam No. 2 because of the equal weight on beams No. 1 and No. 3.

H3 flip-flop 104 provides two beam detection between beams No. 2 and No. 3 by being set true from the output of AND gate 134. Therefore H3 is true when targets are declared by G2 G3, but targets are not stored $\overline{F2}$ $\overline{F3}$ and not yet declared or stored in adjacent and surrounding beams by $\overline{G1}\ \overline{F1}$ and $\overline{G4}\ \overline{F4}$.

The remainder of the flip-flops in the control logic 30 follows a similar pattern with the H4 flip-flop 106 being set true by single beam detection on beam No. 3, or three beam detection on beams No. 2, No. 3 and No. 4. H5 flip-flop 108 operates on two beam detection on beams No. 3 and No. 4.

H6 flip-flop 110 provides single beam detection on beam No. 4 or three beam detection on beams No. 3, No. 4 and No. 5, H7 flip-flop 112 is responsive to two beam detection on beams No. 4 and No. 5, H8 flip-flop 114 is responsive to single beam detection on beam No. 5 or three beam detection on beams No. 4, No. 5 and No. 6, H9 flip-flop 116 is responsive to two beam detection on beams No. 5 and No. 6, H10 flip-flop 118 is responsive to three beam detection on beams No. 5, No. 6 and No. 7 or single beam detection on beam No. 6, and finally H11 flip-flop 120 is responsive to single beam detection on beam No. 7.

It now becomes necessary to subtract the value of one beam from the value of a second beam as ascertained by the counter logic 14 of FIG. 1. For example, it may be necessary to subtract the value of $N-1$ which is the target below the selected beam and from the value of $N+1$ which is the value of the target above the selected target N to determine the value X for placing the beam in its particular location $\Delta N$. This is accomplished within the T and S subtraction logic units 26 and 28 wherein the logic is performed as follows:

Set $T1 = R1-1\ (H1+H2) + R2-1\ (H3+H4) + R3-1$
$(H5+H6) + R4-1\ (H7+H8) + R5-1$
$(H9+H10) + R6-1\ H11$
Reset $T1 = \overline{\text{Set } T1}$
Set $T2 = R1-2\ (H1+H2) + R2-2\ (H3+H4) + R3-2$
$(H5+H6) + R4-2\ (H7+H8) + R5-2$
$(H9+H10) + R6-2\ H11$
Reset $T2 = \overline{\text{Set } T2}$
Set $T3 = R1-3\ (H1+H2) + R2-3\ (H3+H4) + R3-3$
$(H5+H6) + R4-3\ (H7+H8) + R5-3$
$(H9+H10) + R6-3\ H11$
Reset $T3 = \overline{\text{Set } T3}$
Set $T4 = R1-4\ (H1+H2) + R2-4\ (H3+H4) + R3-4$
$(H5+H6) + R4-4\ (H7+H8) + R5-4$
$(H9+H10) + R6-4\ H11$
Reset $T4 = \overline{\text{Set } T4}$
Set $S1 = R2-1\ H1 + R3-1\ (H2+H3) + R4-1\ (H4+H5)$
$+ R5-1\ (H6+H7) + R6-1\ (H8+H9) + R7-1$
$(H10+H11)$
Reset $S1 = \overline{\text{Set } S1}$
Set $S2 = R2-2\ H1 + R3-2\ (H2+H3) + R4-2\ (H4+H5)$
$+ R5-2\ (H6+H7) + R6-2\ (H8+H9) + R7-2$
$(H10+H11)$
Reset $S2 = \overline{\text{Set } S2}$
Set $S3 = R2-3\ H1 + R3-3\ (H2+H3) + R4-3(H4+H5)$
$+ R5-3\ (H6+H7) + R6-3\ (H8+H9) + R7-3$
$(H10+H11)$
Reset $S3 = \overline{\text{Set } S3}$
Set $S4 = R2-4\ H1 + R3-4\ (H2+H3) + R4-4\ (H4+H5)$
$+ R5-4\ (H6+H7) + R6-4\ (H8+H9) + R7-4$
$(H10+H11)$
Reset $S4 = \overline{\text{Set } S4}$ The above equations can be implemented by reference to the FIGS. 6 through 9 for determining the (S) logic and FIGS. 10 through 13 for determining the (T) logic.

FIGS. 6 through 9 illustrate (S) logic diagrams which assures the data presented to the subtractor 32 is the subtrahend of the subtraction term presented thereto and FIGS. 10 through 13 comprise the (T) logic which assures the data presented to the subtractor 32 is the minuend of the subtraction term thereof. Thus assuring that the $N+1$ is subtracted from the $N-1$ to present the X to the tracking computer for performing further computation to determine the precise elevation of a target.

The (S) logic comprises four flip-flops, S1 through S4 wherein S1 flip-flop 150 is set by the output of OR gate 152. OR gate 152 is enabled by the output from AND gate 154, 156, 158, 160, 162 or 164. AND gate 154 is enabled by R2-1 and H1. Where R2-1 represents the most significant digit of a specific radar beam, that has been stored in the buffer register 24 for a single bit time and H1 is single beam detection for beam 1. AND gate 156 is enabled by the term R3-1 and the output from OR gate 168 wherein OR gate 168 is enabled by H2 or H3. AND gate 158 is enabled by an R4-1 and the output of OR gate 170. OR gate 170 is enabled by H4 or H5. AND gate 160 is enabled by the term R5-1 and the output from OR gate 172. OR gate 172 is enabled by H6 or H7. AND gate 162 is enabled by R6-1 and the output from OR gate 174. OR gate 174 is enabled by H8 or H9. And finally AND gate 164 is enabled by R7-1 and the output of OR gate 176. OR gate 176 is enabled by H10 or H11. Flip-flop 150 is reset by the inverted output of OR gate 152 as provided through an inverter 178.

The remaining terms S2, S3 and S4 are provided by the outputs of flip-flops 180, 182 and 184 which are set and re-set by logic similar to that as S1 flip-flop 150 with the exception that they are enabled by different bits from the reversible counters and logic 14.

(T) logic 26 comprises four flip flops, T1, T2, T3 and T4 as shown in FIGS. 10 through 13 wherein FIG. 10, for illustration and explanation, comprises a flip flop 190 which is set from the output of an OR gate 192, which in turn is enabled by AND gate 194, 196, 198, 200, 202 or 204. AND gate 194 is enabled by R1-1 and the output of OR gate 206. OR gate 206 is enabled by H1 or H2. AND gate 196 is enabled by an R2-1 and the output from OR gate 208. OR gate 208 is enabled by H3 or H4. AND gate 198 is enabled by R3-1 and the output from OR gate 210. OR gate 210 is enabled by H5 or H6. AND gate 200 is enabled by R4-1 and the output of OR gate 212. OR gate 212 is enabled by H7 or H8. AND gate 202 is enabled by R5-1 and the output of OR gate 214. OR gate 214 is enabled by H9 or H10. And finally, AND gate 204 is enabled by R6-1 and H11. Flip flop 190 is re-set by the inverted output of OR gate 192 as provided through an inverter 216.

Flip flops T2, T3 and T4 operate in the same manner and the same logic as does the T1 flip flop 190 with the exception that they operate on further digits of the output of the reversible counters and logic 14 and selected radar beams from buffer register 24.

Thus this steering logic provides proper $N-1$ from (T) logic 26 and the $N+1$ from (S) logic 28 whereby, as a way of example, R1-1 $(H1+H2)$ will have R2-1H1 subtracted therefrom, thus keeping with the equations as previously stated.

Thus it can be seen that the objects of this invention are accomplished by referring to the equations, specifications and the drawings as shown wherein the data from selected address location from the memory is presented to the buffer register and the control register at specific range bin times whereby the control register stores the proper beams through (T) logic 26 and (S) logic 28 to the subtractor 32. The buffer register data which comprises the count of hits of a specific range bin through the (T) and (S) logic 26 and 28 and assures an $N+1$. Lobe 58 is always subtracted from the $N-1$ lobe 57 when presented to the subtractor 32.

Having thus described one embodiment of this invention, what is claimed is:

1. A system for determining the profile position of an object within a specific area comprising:
   first means for determining a weighted value of events in a first area which is juxtapositioned on one side of the specific area;
   second means for determining a weighted value of events in a second area which is juxtapositioned on the other side of the specific area; and third means coupled to said first and second means for subtracting the weighted value of events of the first area from the weighted value of the events in the second area.

2. The system as defined in claim 1 wherein the events are electrical impulses and the first area and the second area are spatially located above and below the specific area.

3. The system as defined in claim 1 wherein said events are electrical impulses; the first area and the second area are spatially located above and below the specific area, and the system further comprising:

fourth means for determining a weighted value of events within the specific area to determine whether the object therein reaches a predetermined requirement.

4. A system for determining the relative position of a target within a selected one of a plurality of stacked radar beam lobes comprising:

a radar receiver for each of the plurality of stacked radar beam lobes responsive to radar video return data, said radar receiver including output means;

a reversible counting means for each of the plurality of radar beam lobes;

first logic means coupled between said output means of each said radar receiver and each of said reversible counting means for causing the contents of said reversible counting means to increase or decrease in value depending upon the state of the video returns of said stacked beam lobes;

threshold means coupled to each of said reversible counting means for determining a valid target from an invalid target within a radar lobe by the contents of a particular counting means reaching a predetermined threshold level; and the improvement of which further comprises:

second logic means coupled to each of said reversible counting means for determining the difference between the contents of a counting means representing radar video returns of a radar beam lobe on one adjacent side of the radar beam lobe in which a valid target has been found and the contents of a counting means representing radar video returns of a radar beam lobe on the other adjacent side of the radar lobe in which a valid target has been found.

5. The system as defined in claim 4 wherein said predetermined increments in the first value are N and said predetermined increments in a second value are N/2.

6. The system as defined in claim 4 further comprising:

a memory storage device coupled to said plurality of reversible counting means for storing particular video returns of predetermined range bins in associated memory address locations; and recirculating means coupled to said memory storage device for circulating the contents of the address locations of said memory storage device through said counting means in a timed relationship with the range bins of the radar video returns to said receivers.

7. A data processor comprising:

memory means having a plurality of address storage locations;

data input means for receiving radar video returns data from a stacked beam radar surveillance system, the data being stored in predetermined ones of said address locations of said memory means, said address locations corresponding to range bins of the radar video returns;

recirculating means coupled to said memory means and said data input means for updating the data in said memory means, said recirculating means being responsive to the data received by said data input means for updating the contents of each address location;

means coupled to said memory means for determining a specific information regarding the contents of a particular address location by considering the contents of adjacent address locations;

said means for determining the specific information being a subtractor which is adapted to subtract the contents of an address location corresponding to a radar lobe above and adjacent to a beam which contains a target from the contents of an address location corresponding to a radar lobe below and adjacent to the beam which contains a target.

8. The data processor as defined in claim 7 further comprising:

first logic means for steering subtrahend data to said subtractor; and second logic means for steering minuend data to said subtractor.

9. The data processor as defined in claim 7 and further comprising:

means for determining the position of the target in said radar beam lobe by the output value of the product of said subtractor.

References Cited

UNITED STATES PATENTS 3,286,258  11/1966  McQueen _____ 343—5 XR

RICHARD A. FARLEY, Primary Examiner

U.S. Cl. X.R.

343—12